Oct. 31, 1950  A. E. VOIGT  2,527,977
GENERATOR DRIVE BELT CONTROL MECHANISM
Filed March 4, 1946  3 Sheets-Sheet 1
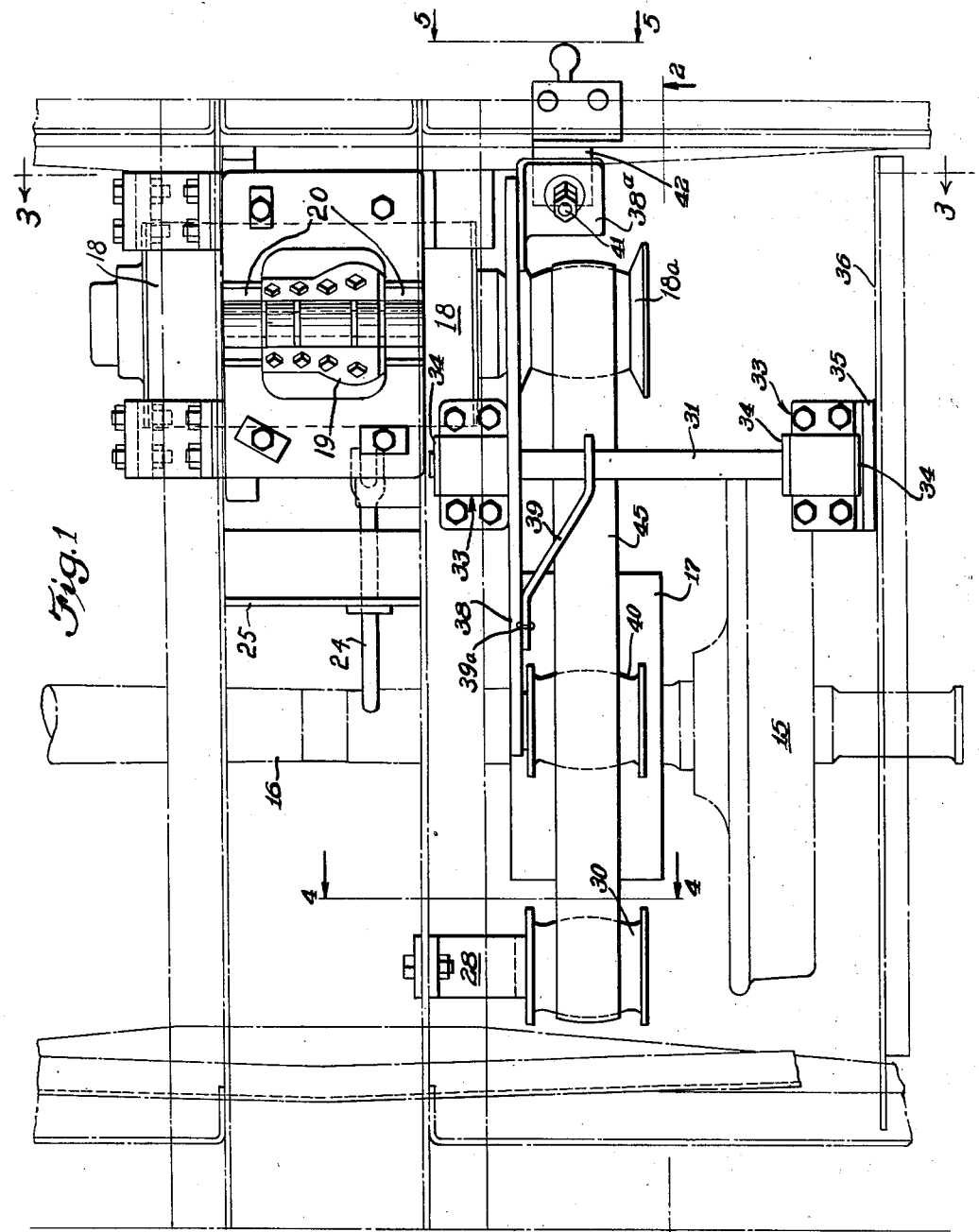
INVENTOR.
Alexander E. Voigt,
BY
Atty.

Oct. 31, 1950 A. E. VOIGT 2,527,977
GENERATOR DRIVE BELT CONTROL MECHANISM
Filed March 4, 1946 3 Sheets-Sheet 2
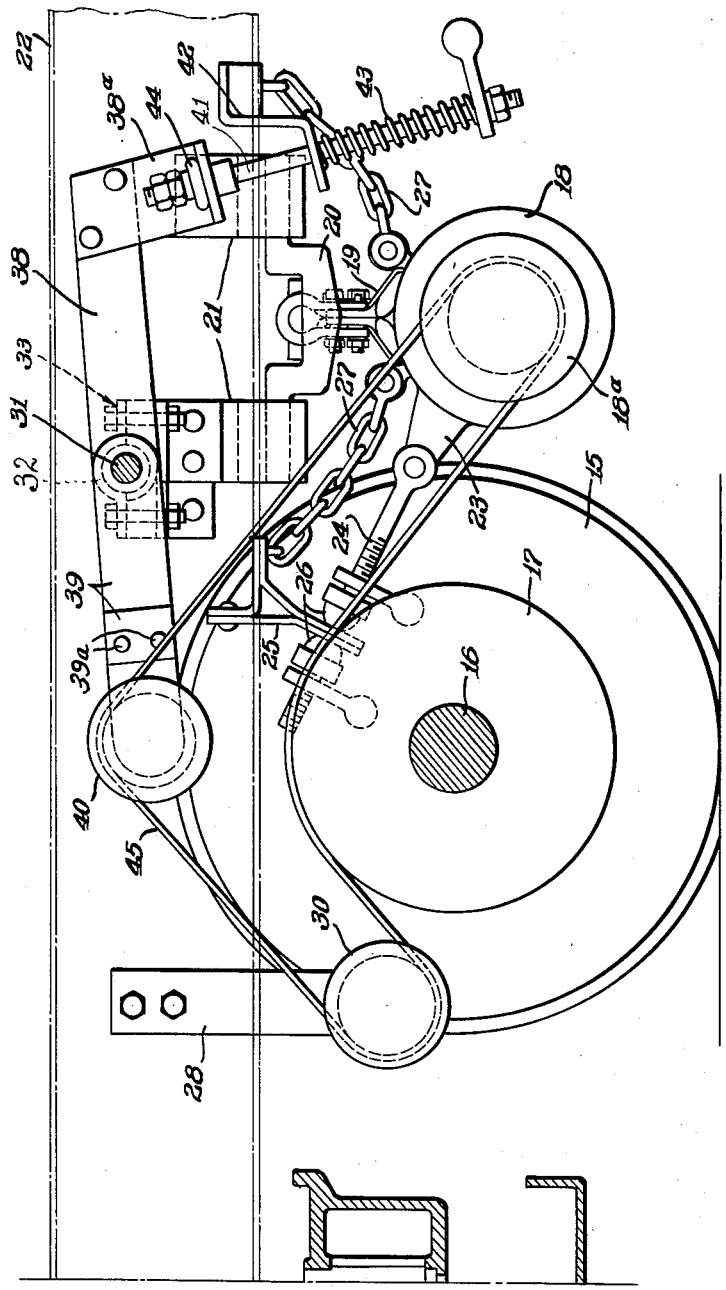
INVENTOR.
Alexander E. Voigt,
BY
Atty Oct. 31, 1950 — A. E. VOIGT — 2,527,977
GENERATOR DRIVE BELT CONTROL MECHANISM
Filed March 4, 1946 — 3 Sheets-Sheet 3
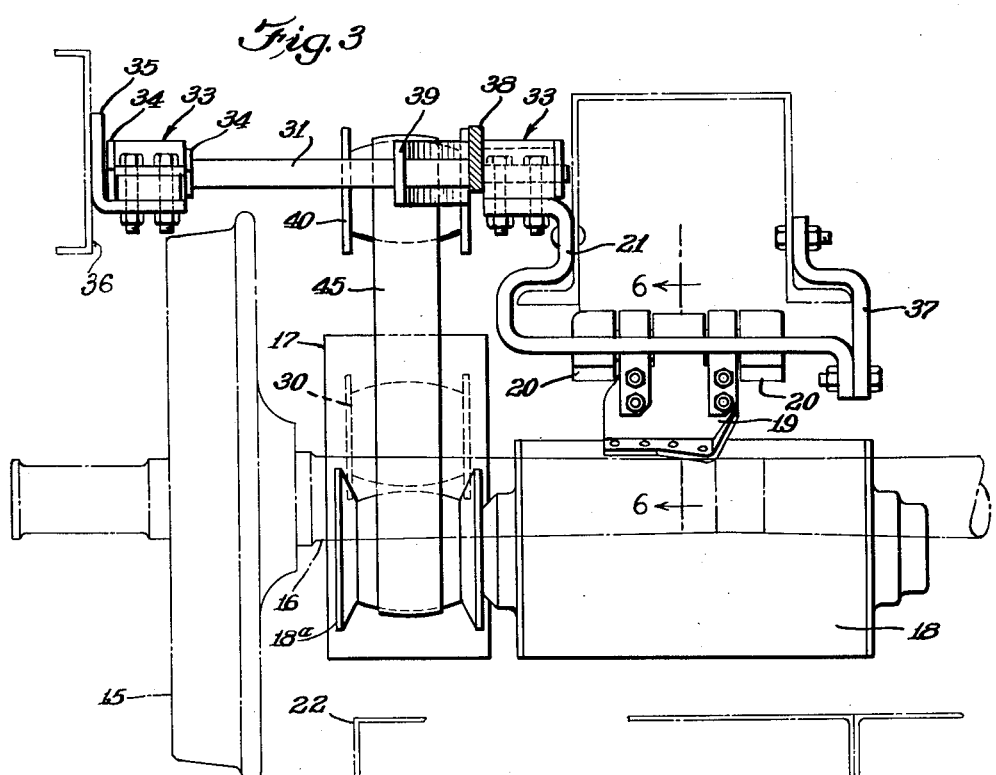
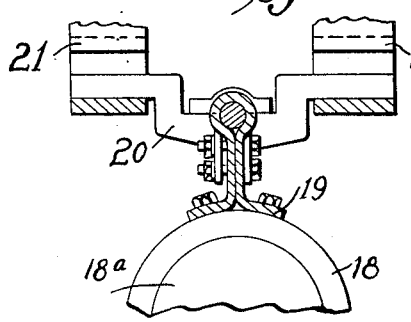
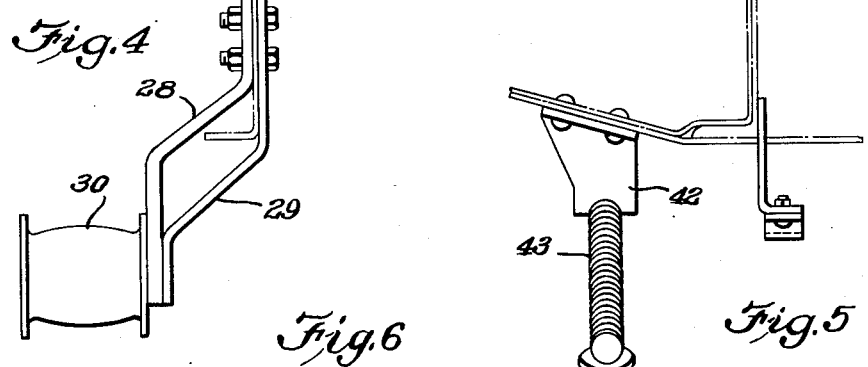
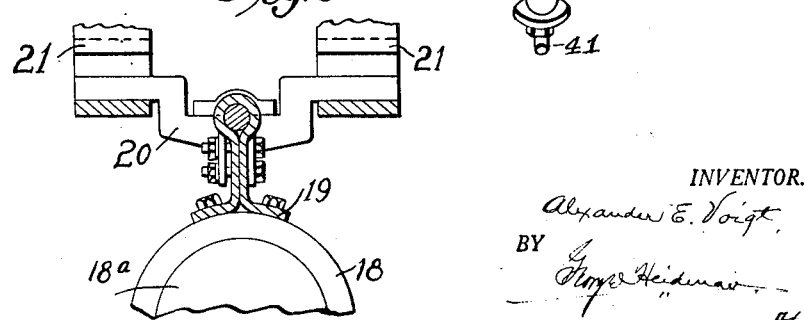
INVENTOR.
Alexander E. Voigt Patented Oct. 31, 1950

2,527,977

UNITED STATES PATENT OFFICE 2,527,977

GENERATOR DRIVE BELT CONTROL MECHANISM

Alexander E. Voigt, Topeka, Kans.

Application March 4, 1946, Serial No. 651,897

1 Claim. (Cl. 105—106)

My invention relates more particularly to mechanism whereby the use of continuous or endless belts for driving the generators employed on railway cars is made possible and easy application and/or removal of the belt provided.

My invention has for one of its objects the provision of generator suspension and belt control mechanism adapted to be secured to the longitudinally disposed car floor or under-sills whereby the respective belt controlling pulleys are held and maintained in proper parallel arrangement by suitably supported stub-shafts, thereby enabling ready application of an endless belt without necessitating dismantling of the mechanism; the arrangement permitting the drive belt to assume proper position on the drive or axle pulley when the car-truck is rounding a curve, and at the same time retain proper alignment with the other pulleys of the mechanism.

Another object of my invention is the provision of mechanism whereby the pendently supported generator will be held in a stationary position, thereby relieving the drive belt of the severe slaps and shocks to which it heretofore has been subjected whereby its period of usefulness was materially decreased.

The aforesaid objects and advantages, as well as other advantages inherent in the invention, all will be readily comprehended from the following detailed description of the accompanying drawings wherein—

Figure 1 is a plan view of my improved mechanism, with a portion of the car floor supporting structure and a portion of the drive axle also shown.

Figure 2 is a sectional plan taken substantially on the line 2—2 of Figure 1.

Figure 3 is a sectional view taken substantially on the line 3—3 of Figure 1, looking in the direction of the arrows.

Figure 4 is a detail sectional view on the line 4—4 of Figure 1 as viewed in the direction of the arrows.

Figure 5 is a detail elevation as viewed from the line 5—5 of Figure 1.

Figure 6 is a detail sectional view of the generator suspending means taken on the line 6—6 of Figure 3.

My invention relates more particularly to an endless belt drive for the type of generators employed on railway cars, either passenger or freight, which are mounted beneath the car-floor and are driven from one of the wheel carrying axles of one of the car trucks as disclosed in the exemplification of the invention illustrated in the drawings wherein one of the truck wheels is shown at 15, mounted on axle 16, which, at a suitable point within the truck side frame is provided with a suitable sized pulley 17. Pulley 17 constitutes the drive pulley and preferably is provided with a flat face and is of substantial width as shown in Figure 1. The pulley 17, of course, is keyed or otherwise secured to the axle so as to revolve therewith.

The generator is shown at 18 and is pendently supported, through the medium of the upstanding arms 19, 19 by suitable bracket mechanism 20, 21, Figure 2, rigidly secured to a floor supporting sill of the car as indicated at 22 and at a predetermined distance removed from the car-truck. The generator is pivotally suspended to swing toward or away from the truck and is shown provided with a radially disposed arm 23 to which a threaded rod 24 is pivotally connected. The threaded rod 24 extends through a bracket 25 rigidly secured to the car underframe; the rod 24 being provided with ball-nuts 26 and suitable lock-nuts, with the ball-nuts arranged to engage opposite sides of the bracket to lock the generator in the desired or proper operating position. The generator also is provided with the usual slack safety chains at 27.

Rigidly secured to the car sill 22 in a vertical plane, intermediate the axle pulley 17 and the truck frame, is a downwardly disposed bracket preferably composed of two angularly disposed arms 28, 29, whose lower ends are provided with a stub-shaft on which an idler pulley 30 is rotatably mounted and arranged in a horizontal plane somewhat beneath the horizontal plane of the top of the drive or axle pulley 17, see Figure 2. The position of pulley 30 is predetermined and the bracket 28, 29 is then rigidly bolted or secured in place against movement; the bracket members 28, 29 being bent outwardly toward the bottom so as to arrange the idler pulley 30 within the vertical planes of the two sides of the axle or drive pulley 17, see Figure 1.

Disposed in a direction transversely of the car, parallel with the wheel-axle and in a vertical plane intermediate the vertical planes of axle pulley 17 and the suspension point of the generator 18 is a shaft 31 whose ends preferably are provided with rubber bushings at 32 indicated in dotted lines Figure 2, arranged under compression in the bearing blocks and their removable caps indicated at 33, 33; and the sides of the bearings closed by washers consisting of half washers welded to the bearing blocks and matching half washers welded to the removable caps—the washers being indicated at 34 and arranged to close the sides of the bearings. The rubber bushings, under compression, are employed to reduce metallic wear, due to the difficulty encountered in properly lubricating a metal bearing where not much movement is had; the rubber bushings or bearings at the same time cushion the floating or adjustable idler pulley (hereafter to be described) and its bearings from shock.

The bearing blocks 33 preferably are removably secured to brackets which may also be removably secured to the car-sills; namely the bearing block 33 at what may be termed the outer end of shaft 31 is secured to an angle bracket 35, attached to the floor-sill 36; while the bearing block 33 at the inner end of the shaft 31 is mounted on the bracket member 21 which is secured to the car center sill 22. The bracket member 21 preferably is of the shape shown in Figure 3, being bent beneath and to the opposite side of the center sill where it is rigidly supported by bracket arm 37; the horizontally disposed portion of bracket member 21 also constituting means for pendently supporting the generator.

Rigidly secured to shaft 31 adjacent its inner end is a bar or lever 38 which extends beyond opposite sides of the shaft 31 and preferably is held against lateral deflection by a brace bar 39 (see Figure 1) welded on the shaft 31 and its outer end preferably riveted to lever 38 at a point intermediate the lever connection with shaft 31 and the pulley carrying end of the lever as shown at 39ᵃ Figures 1 and 2. The last mentioned end of the lever 38 is provided with a suitable pintle or stub-shaft for rotatably mounting the idler pulley 40 in the vertical plane of and above the axis of the drive pulley 17, see Figure 2.

The other end of lever 38 is provided with a downwardly sloping extension 38ᵃ flanged at its lower end and apertured to receive the upper end of a tension rod 41, threaded at its ends and provided with adjusting nuts. The rod 41 also extends through an angular bracket member 42, secured to the side of the center sill, and which constitutes a stop for the upper end of an expanding coil or tension spring 43. The upper end of rod 41 preferably is provided with a ball bushing at 44, held in place by suitable lock nut as shown in Figure 2. As is apparent from the construction, the upward swing of the pulley carrying end of lever 38 is controlled by the downward pull of the rod 41 through the action of the spring 43 which yieldingly maintains the belt 45 in constant tension and compensates for the vertical relative movement between car body and the wheel axle.

The endless belt 45 is arranged on the pulley 18ᵃ secured to the rotor or armature shaft of the generator 18, passes over the axle pulley 17, about idler pulley 30, thence over tension pulley 40 and back to the generator pulley 18ᵃ, see Figure 2. In order to apply the belt, the nuts on generator positioning rod 24 are released to allow the generator to be swung toward the wheel axle or axle pulley 17 and if need be the spring tension on the idler pulley lever 38 may somewhat be released; and as the structure provides free access at the outer ends or sides of the pulleys, the endless belt may be easily slipped onto the respective pulleys without need for dismantling any part of the structure. As soon as the belt has been slipped into place, the generator is then swung back to the desired position and the control rod 24 again made secure by the ball nuts, thereby firmly holding the generator against swinging movement. The tension of tension spring 43 is then regulated to properly position the idler pulley 40 until the belt is under the desired tension.

With my improved mechanism, all belt pulleys, with the exception of the drive or axle pulley, are mounted on the car underframe which enables their being mounted in the same vertical plane parallel with the car under sills and to be kept in proper alignment with each other thereby enhancing the life of the belt.

As shown in the drawings, all of the pulleys except the axle pulley are crowned pulleys while the axle pulley has a flat face and is of substantial width materially wider than the belt 45, see Figures 1 and 3.

This enables the belt to be kept in proper alignment regardless of wheel play or track curves, as the belt merely engages the top of the flat faced axle pulley, permitting the belt to angle or take any position necessary on the axle pulley to maintain alignment with the other pulleys while the car truck rounds a curve. With the generator held stationary, and not free to oscillate as is the case in constructions heretofore employed, the belt is not subjected to the slaps or shocks caused by the weight of the generator, plus the spring tension of the belt, thrown against the belt during starting or stopping of the train. In my improved mechanism, the belt tension is applied through the yieldingly held adjustable idler pulley in a vertical direction thereby practically eliminating the shocks. The elimination of these shocks and the opportunity to employ an endless belt in place of the clamped-end type of belt, increases the life of the belt and avoids the frequent belt losses and failures of power equipment and reduces the high maintenance cost encountered with present day belt driven railroad car generators; and the possibility to make adjustment of the vertically movable idler pulley together with adjustment of the generator position permits continuation in service of the endless belt throughout its life even though considerable stretch occurs.

By employing the rubber bushing or bearing, under compression, for the pulley carrying lever, metallic wear is materially reduced and the pulley and its bearings cushioned against shock.

With my improved mechanism wherein all pulleys, with the exception of the drive or axle pulley, are supported from the same longitudinal sill of the car (in this instance the center sill) it is apparent that all pulleys will be constantly maintained in the same longitudinal plane; and with the drive belt arranged to frictionally engage the top of the axle pulley it is evident that application and/or removal of the drive belt may be made without necessity of jacking-up the car wheel; the belt, regardless of stretch, constantly being frictionally maintained in driving relation with the axle pulley by the yielding upward pull of the adjustable idler pulley 40.

Furthermore, the manner of hingedly mounting the generator on the car body at any suitable desired location facilitates removal or application of the belt.

The construction shown and described is believed to be a simple embodiment of the invention which has been described in terms of description and not as terms of limitation as structural modifications may be made without, however, departing from the spirit of my invention as defined in the appended claim.

What I claim is:

In mechanism of the character described for the driving belt of an electric generator of a railroad car wherein all elements are secured to the rigid underframe members of the car and arranged to be disposed in the same plane longitudinally of the car and comprising the combination of a railway car axle provided with a wide flat-faced pulley and an electric generator non-shiftably suspended from the car underframe at one side of the car axle, the rotor shaft of the generator being extended outwardly toward one side of the car and provided with a pulley; a vertically extending bracket rigidly depending from the car undersill at the side of the car axle opposite to that of the generator and provided with a stub-axle having an idler pulley arranged in a horizontal plane below that of the top of the axle pulley; automatic belt tightener means consisting of a vertically swingable lever supported by the car underframe intermediate its ends above the generator and said axle pulley, with one end provided with a stub shaft having a pulley arranged substantially in the vertical plane of the axle pulley and spaced thereabove; regulable tension applying means operatively intermediate the other end of said swingable lever and the car underframe whereby the pulley end of said lever is placed under upwardly exerting tension; all of said pulleys being alined in the same vertical plane extending lengthwise of the car and all, with the exception of the axle pulley, being open to access from the same side of the car; and an endless belt arranged on all of said pulleys and edgewisely removable with one stretch across the axle pulley and one stretch across the tension applying pulley.

ALEXANDER E. VOIGT.

REFERENCES CITED

The following references are of record in the file of this patent:

UNITED STATES PATENTS

| Number | Name | Date |
|---|---|---|
| 634,542 | Richards | Oct. 10, 1899 |
| 1,168,446 | Viullenmier | Jan. 18, 1916 |
| 1,313,116 | Rollman | Aug. 12, 1919 |
| 1,379,055 | Smith | May 24, 1921 |
| 1,706,562 | Dake | Mar. 26, 1929 |
| 1,714,092 | Johnson | May 21, 1929 |
| 1,751,621 | Dake | Mar. 25, 1930 |
| 2,006,614 | Wuesthoff | July 2, 1935 |